Figure 1:
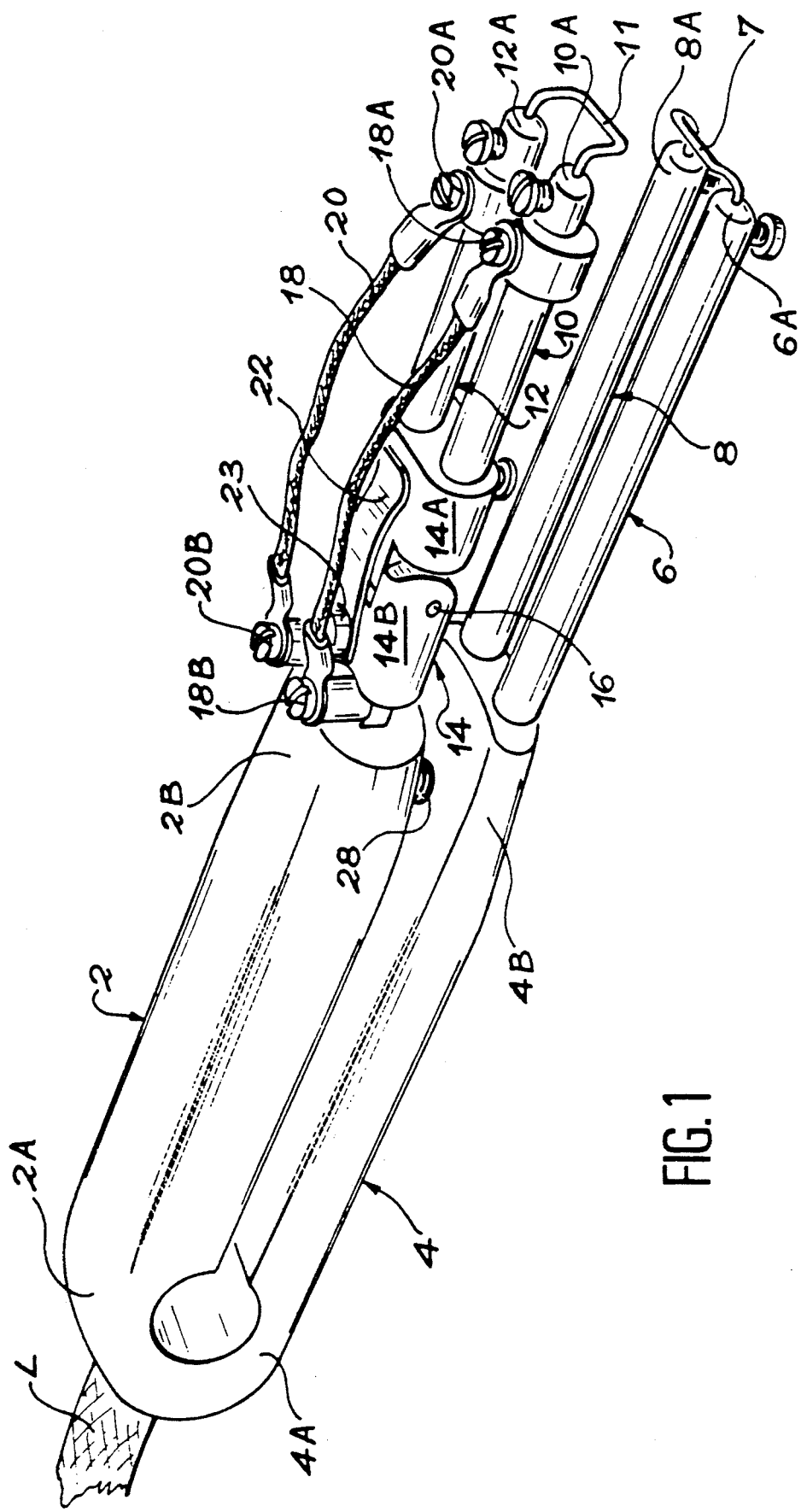

United States Patent [19]

Pierrot

[11] Patent Number: 5,309,795
[45] Date of Patent: May 10, 1994

[54] THERMAL STRIPPING TONGS

[75] Inventor: Michel Pierrot, Les Mureaux, France

[73] Assignee: Aerospatiale Societe Nationale Industrielle, Paris, France

[21] Appl. No.: 974,240

[22] Filed: Nov. 10, 1992

[30] Foreign Application Priority Data

Nov. 15, 1991 [FR] France ................ 91 14104

[51] Int. Cl.$^5$ ............................................. H02G 1/12
[52] U.S. Cl. .................................... 81/9.4; 81/9.44
[58] Field of Search ............... 81/9.4, 9.44; 219/228, 219/229, 230, 233, 234, 235, 240, 241

[56] References Cited

U.S. PATENT DOCUMENTS 3,139,777  7/1964  Gindoff ........................... 81/9.44
3,752,017  8/1973  Lloyd et al. .................. 219/233 X

FOREIGN PATENT DOCUMENTS 2189903  6/1972  France ................ H02G 1/12D

Primary Examiner—D. S. Meislin
Attorney, Agent, or Firm—Hayes, Soloway, Hennessey, Grossman & Hage

[57] ABSTRACT

Tongs for thermally stripping or baring wires of electric cables comprises two handles (2,4) on which are mounted two pairs of rods (6,8) and (10,12). Each of the pairs is connected to an electrode (7,11) able to come into contact with the cable to be stripped. The rods (10,12) are articulated at an articulation or joint (16), so as to ensure that the application force of the electrode (11) to the cable is independent of the force applied by the operator to the handles of the tongs. Spring blade (22) and abutments (24,26) ensure the calibration of the application force of the electrode (11) to the cable.

5 Claims, 2 Drawing Sheets

THERMAL STRIPPING TONGS

DESCRIPTION

The present invention relates to tongs for thermally baring or stripping electrical cables or wires. It has numerous applications in the electronics and electrical fields, in which most connections between electronic components and/or electrical equipment require the stripping of electrical cables or wires.

The stripping or baring of electrical cables or wires consists of removing, from at least one end of the wire or cable, the insulating material surrounding the strands of the electrical conductor and which are also referred to as the conductor core.

There are various types of stripping tongs already in existence, particularly the thermal stripping tongs of the type marketed under the designations P. B. 150 and P. B. 150M by the TMC company. The thermal stripper DT4 of Dubbar Electronique France has, like most thermal stripping tongs, two articulated handles on which are mounted electrically conductive rods. To said rods are fixed electrically heated blades or knives, or electrodes. On contact with these electrodes, an impression is made in the electrical insulant, which can then be removed from the electrical conductor leaving the conductor strands bare.

The contact of said electrodes on the electrical cable or wire to be stripped is established by the pressure of the operator's hand on the two handles of the tongs, so as to tighten said handles and therefore move together the two electrodes so as to permit contact between said electrodes and the electrical cable introduced by the operator between said two electrodes. A regulatable abutment located between the two handles makes it possible to determine a minimum value of the desired spacing between the electrodes on closing the tongs. This regulation of the abutment makes it possible to strip cables and wires having different sections.

However, there are considerable risks of cutting the electrical conductors. Thus, the regulation of the abutment requires considerable accuracy on the part of the operator in order to obtain an optimum spacing between the two electrodes. It frequently occurs that the application force of the electrodes to the cable is not controlled and that the conductor strands are cut in or through.

This prior art stripping tongs also suffers from the disadvantage of a complex stripping of oversheathed shielded cables, particularly when they are of a multi-conductor nature. Thus, said cables are not cylindrical and usually require the application to said cable of the electrodes on two occasions, in order to produce impressions on the contour (or on part of the contour of the cable). As the cable is not cylindrical, for each application of the electrodes to the cable, it is necessary to modify the setting of the abutment. It is therefore difficult to maintain a constant spacing of the electrodes in order to repeat the same operation on several identical cables, or even on the two ends of the same cable.

Moreover, the application force of the electrodes to the cable is dependent on the force applied by the operator to the handles, so that it is difficult for said operator to make a regular impression on the entire contour of the cable by performing a rotation of said cable between the electrodes.

U.S. Pat. No. 3,139,777 also describes a stripping tongs. The latter has two tightening or clamping arms, on the outsides of which are mounted two spring blades. Each of two heating knives is located at a free end of one of the spring blades. These heating knives are able to melt the sheath of the wire to be stripped introduced into the tongs. Each clamping arm has on its inside a lug and also an orifice into which can be introduced the lug of the opposite arm. When the clamping arms are moved together, each of the lugs traverses the opposite locking arm and acts by pressure on the spring blade in order to maintain a minimum spacing between the two heating knives.

However, such a stripping tongs does not make it possible to obtain a melting impression on the entire circumference of the insulant of the cable to be stripped. In addition, several successive pressures of the electrodes on the cable are necessary. However, the application force of the heating knives to the cable, via the pressure exerted by the user on the clamping arms, is difficult to control, so that the impression made on the contour of the insulant can hardly be constant, which makes it difficult to extract the said insulant.

Moreover, the disadvantages described hereinbefore have the consequence of increasing the risk of cutting in or through the conductor strands. There are also considerable risks of deterioration to the metal covering of the conductor core. Moreover, in the case of shielded cables, there are risks of transmitting excessive thermomechanical stresses to the insulants of said cables, which can lead to insulation defects or to short-circuits between cores and shieldings. Moreover, in the case of coaxial cables, the characteristic impedance of said cable can deteriorate under the effect of the harmful action of the dielectric.

The object of the present invention is to obviate these disadvantages by proposing a thermal stripping tongs making it possible to apply to the cable the said electrodes with a force independent of the application force exerted on the handles by the operator. The application force of the electrodes to the cable is then reproducible, adaptable to the nature of the cable to be stripped and constant during the rotations of a non-cylindrical cable between the electrodes.

More specifically, the present invention relates to tongs for stripping electrical cables or wires having at least two heating elements and tightening means for moving together the heating elements, characterized in that it comprises connecting means for establishing a flexible connection between a first heating element and the tightening means and elastic means acting between the tightening means and the first heating element in order to maintain said heating element in a position close to the other heating element and permit a withdrawal movement of the first heating element from the other heating element in order to limit the contact force between the heating elements and the electrical cable to a predetermined force.

Advantageously, it also comprises abutment means limiting the withdrawal movement of the first heating element to a predetermined value. Moreover, the elastic means incorporate a spring blade.

According to an embodiment of the invention, the connection means have an articulation ensuring the assembly of the first heating element to the tightening means.

According to another embodiment, the connection means have a flexible blade fixed between the first heating element and the tightening means.

More specifically, the tightening means have two articulated handles on which are fitted at least two electrically conductive rods.

Advantageously, the tongs can have at least one regulatable abutment located between the two handles.

In an embodiment of the invention, the heating elements are electrodes.

In another embodiment, the heating elements are heating knives.

Other advantages and characteristics of the invention can be gathered from the following non-limitative description with reference to the attached drawings, wherein show:

FIG. 1—a perspective view of the stripping tongs according to the invention in its inoperative position.

Figure 2:
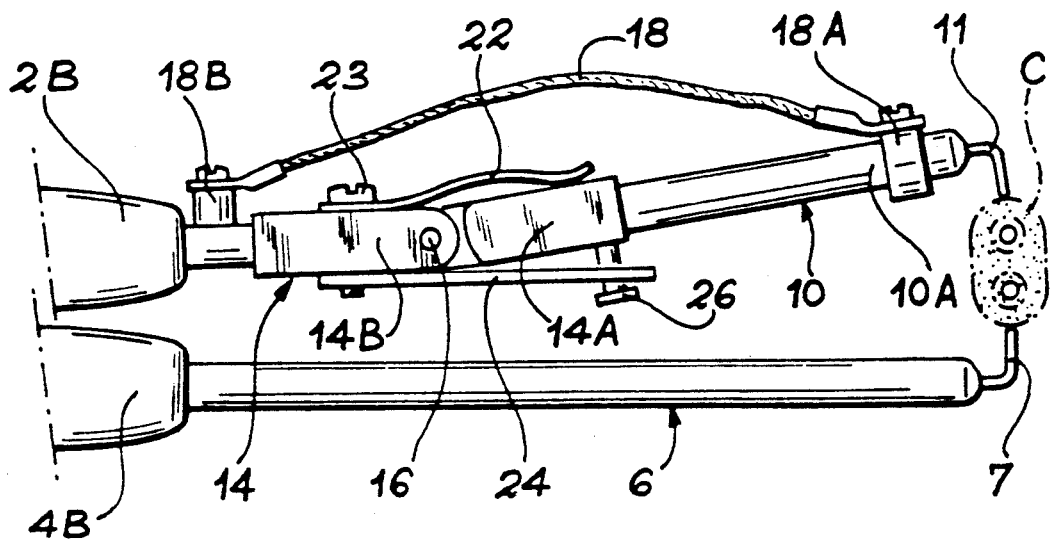

FIG. 2—in profile view, part of said tongs and more specifically the elastic means and the flexible connection means during the stripping of a cable.

Figure 3:
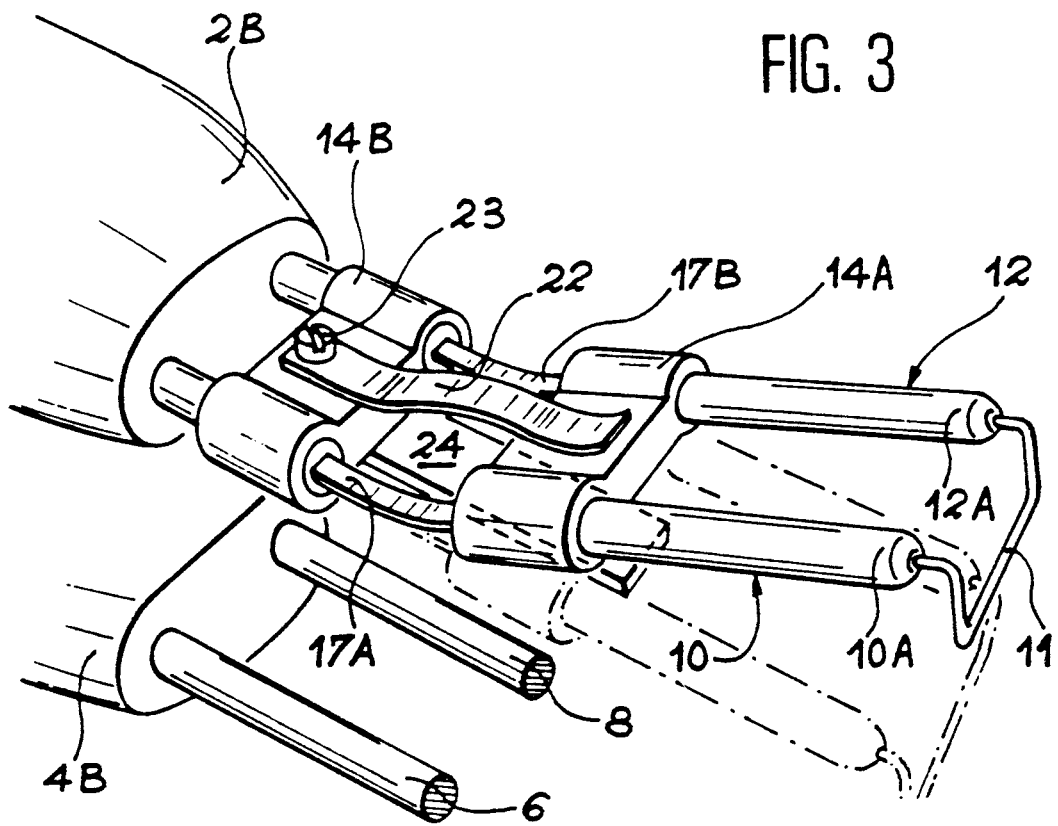

FIG. 3—a profile view of the same part of the tongs as in FIG. 2, in the second embodiment of the flexible connection means.

FIG. 1 shows in perspective a diagram of the stripping tongs according to the invention. The stripping tongs comprise two handles 2,4 articulated at their respective end 2A,4A. The term "upper handle" will be used to define the handle 2 and "lower handle" to define the handle 4. On the end 2B of the upper handle 2 are mounted two upper rods 10,12. On the end 4B of the lower handle 4 are fitted two lower rods 6 and 8. These rods 10,12 and 6,8 are mounted pairwise on each of the handles 2,4. On the free ends 10A,12A,6A,8A of said two pairs of rods 10/12 and 6/8 are mounted upper and lower heating elements 11 and 7 respectively. Each of these heating elements 11,7 is connected to one end of each of the rods of the pair of respective rods 10/12 and 6/8.

These heating elements 7 and 11 can, according to an embodiment, be electrodes.

According to another embodiment, these heating elements 7 and 11 can be heating knives.

Throughout the remainder of the following exemplified description the heating elements 7 and 11 are constituted by electrodes. These electrodes 7 and 11 act on the cable introduced by the heat effect into the tongs. In addition, these electrodes 7 and 11 must be supplied with electricity. Therefore the tongs are connected to a not shown power supply. The electrical connection L connects said power supply to the tongs and more specifically to the electrodes 7 and 11 via rods 6/8 and 10/12, said rods being at least partly electrically conductive.

The electrical connection L connecting the power supply to the tongs is at least partly introduced into the lower handle 4 and is connected to the rods 6 and 8 made from an electrically conductive material. In this way, the electrode 7 fixed to the rods 6 and 8 is supplied with electric power from the electric power supply.

Each rod 10,12 has a first part 10A,12A and a second part, which is not visible in the drawing. The second part is fixed relative to the handle 2 and is called the fixed part. The first part 10A,12A is mobile and is called the mobile part. The fixed and mobile parts are articulated by a flexible connection 16. An insulating block 14 surrounds the fixed and mobile parts of the rods 10,12 around the flexible connection 16. This insulating block 14 comprises a first part 14B fixed relative to the upper handle 2 and a second part 14A integral with the mobile parts 10A,12A of the rods 10,12. The parts 14A and 14B of the insulating block 14 are also articulated by the flexible connection 16.

In FIG. 1, the flexible connection 16 is an articulation and more specifically a spindle permitting a rotation of the mobile parts 14A,10A,12A of the insulating block 14 and the rods 10,12 relative to the handle 2.

Electricity is supplied to the electrode 11 by means of conductive wires 18 and 20 connected on the one hand to the mobile parts 10A,12A of the rods 10,12 by connection means 18A,20A and connected on the other hand to the fixed parts of the rods 10,12 by connection means 18B,20B. These conductive wires 18,20 are connected to the power supply via the connection L, which is partly introduced into the upper handle 2 in order to be connected to the fixed part of the rods 10,12. They ensure the electrical power supply of the electrode 11. Thus, as the blocks 14A and 14B are of an insulating nature and are also articulated at 16, the electrical conduction to the electrode 11 by the rods 10 and 12 is interrupted, which requires the existence of conductive wires 18,20.

FIG. 1 also shows elastic means on the one hand making it possible to return to the inoperative position of the mobile part of the rods 10 and 12 and also establish a quasi-constant contact between the electrodes 7,11 and the cable to be stripped, when said cable is introduced into the tongs.

These elastic means incorporate a spring blade 22 fixed by fixing means 23 to the fixed part 14B of the insulating block 14 and bearing on the mobile part 14A of said block 14. They make it possible to render independent the application force of the electrodes to the cable compared with the application force by the operator to the handles 2 and 4.

The stripping tongs shown in FIG. 1 also comprise an abutment 28 located between the two upper 2 and lower 4 handles. This regulating abutment 28 is regulatable and makes it possible to regulate the minimum of the desired spacing between the two handles of the tongs and therefore between the two pairs of rods 6/8 and 10/12.

FIG. 2 shows, in side view, part of the tongs to be stripped, namely the rods 6/10, as well as the electrodes 7,11. Unlike in FIG. 1, which shows the tongs in the inoperative position, FIG. 2 shows part of the tongs when a cable C is introduced into the same in order to be stripped or bared. The cable C is shown in the drawing in a folded back section.

FIG. 2 shows the insulating block 14 with its fixed part 14B and its mobile part 14A both connected by the articulation or joint 16. The spring blade 22 fixed to the fixed part 14B bears on the mobile part 14A of the insulating block 14, thus permitting the contact of the electrode 11 on the cable C. Thus, the cable C to be stripped is positioned between the two electrodes 7,11, the application force of the electrode 11 being solely dependent on the application force of the spring 22 to the mobile part 14A.

FIG. 2 also shows a plate 24, which is fixed beneath the insulating block 14, so as to be integral with the fixed part 14B. This plate 24 has an opening beneath the mobile part 14A through which is introduced a locking pin 26. The locking pin 26 traverses the opening in the plate 24 and is fixed in the mobile part 14A of the insulating block. The assembly constituted by the plate 24 and the locking pin 26 provides abutment means for the mobile part 14A of the insulating block. These abutment means have two essential functions. Their first function is to limit the movement of the mobile part, so as not to exceed the elastic limit of the spring blade 22. The second function of the abutment means 24/26 is to make it possible to return said mobile part to the inoperative position, i.e. the realignment of the mobile part 14A with the fixed part 14B and therefore the mobile parts 10A,12A with the fixed parts of the rods 10,12, when the cable C has been stripped.

Moreover, the regulating abutment (28 in FIG. 1) has a security function with respect to the abutment means 24/26. The regulating abutment 28 is regulated in such a way that when the electrodes 7,11 are applied to the cable, the locking pin 26 is not in contact with the plate 24, which ensures the control of the force applied to the cable by the electrodes.

In addition, as the regulating abutment between the two handles of the tongs has been correctly regulated (as explained hereinbefore), the locking pin 26 is not in contact with the plate 24, which ensures that the force exerted by the electrode 11 on the cable C corresponds to the value of the force chosen by the operator. This value of the application force of the electrode 11 to the cable C varies as a function of the elasticity of the spring blade 22. Thus, the means 23 for fixing the spring blade to the fixed part 14B can e.g. be a screw system, i.e. a system permitting an easy dismantling of the spring blade 22. The operator can also use spring blades having different stiffnesses as a function of the use cases, i.e. as a function of the cable type to be stripped. As a function of the spring blade used and taking account of the friction between said blade and the mobile part 14A, the force exerted by the electrode 7,11 on the cable C varies essentially between 2 and slightly more than 10 Newtons.

When the impression made on the contour of the insulant of the cable C has been produced, said cable C is removed from between the electrodes 7 and 11 so as to separate the conductor core from the insulant. The mobile parts 10A,12A,14A of the rods 10 and 12 then return under the pressure of the spring blade 22 to their inoperative position, namely the part 14A comes into contact with the plate 24. There is consequently a realignment of the rods 10,12 with the handle 2 along the longitudinal axis of the tongs to be stripped.

The putting into use of the tongs according to the invention firstly consists of regulating the regulating abutment as a function of the cable type to be stripped. When the abutment has been regulated, the operator closes the tongs by pressing the two handles against one another. The electrodes then simultaneously come into contact with the cable C, the mobile parts of the upper rods performing a rotation with respect to the fixed parts, so that the upper electrode exerts a calibrated force on the said cable. As the electrodes are electrically supplied, a calibrated impression is made under the effect of the heat produced by said electrodes on the cable insulant. The cable is then removed from the tongs. When this release has taken place, the mobile parts of the upper rods are realigned as a result of the plate 24 in accordance with the axis of the upper handle.

FIG. 3 is a perspective plan view of part of stripping tongs in another embodiment of the flexible connection ensuring the rotation of the mobile part 10A relative to the fixed part of the rod 10. This flexible connection has for each rod 10,12 a blade 17A,17B respectively produced from an electrically conductive and relatively elastic alloy. These blades 17A,17B are brazed or mechanically fixed between the mobile parts 10A,12A and the fixed parts of the rods 10 and 12. These blades 17A,17B are made from elastic material, such as bronze or beryllium and are therefore able to curve so as to permit a rotation of the mobile parts 10A,12A with respect to the fixed parts of the rods 10,12.

In mixed line form, it is possible to see the mobile parts 10A, 12A in the inoperative position. It is also possible to see a part 4A of the lower handle, as well as the rods 6,8 fixed to said handle.

For such an embodiment, the conductive wires 18,20 are not necessary, because the blades 17A,17B are electrically conductive. Thus, the power supply to the electrode 11 takes place directly by means of the rods 10,12 of the blades 17A,17B.

It is obvious that the operation of stripping tongs in this embodiment is virtually the same as that described hereinbefore in connection with FIGS. 1 and 2 and only the value of the stiffness of the spring blade 22 can differ in one or other of the embodiments in order to take account of the elasticity of the blades 17A and 17B.

I claim:

1. In tongs for stripping electrical cables comprising at least two heating elements (7,11) mounted, respectively, on the free ends of rods (6,8,10,12), which rods in turn are fitted, respectively, to the free ends (4B, 2B) of a pair of handles (2,4), said handles (2,4) being articulated at their other ends (2A, 2B), and connection means (16) for establishing a flexible connection between first and second portions of one of said rods, the improvement wherein said flexible connection comprises an articulation between the first and second portions of said one of said rods, a stop means (24) carried by one portion of said articulation for limiting movement of the other portion of said articulation towards the other handle and rod, and elastic means (22) acting between said first and second portions in order to maintain the first heating element in a position close to the other heating element, whilst still permitting a movement of said first heating element away from the other heating element, so as to impose on the contact force of the heating elements on the electrical cable a predetermined force of constant intensity and said elastic means limiting movement of the first heating element away from the second heating element to a predetermined value.

2. In tongs according to claim 1, wherein the elastic means comprises a spring blade.

3. In tongs according to claim 1, wherein the connection means comprises at least one flexible blade (17) fixed between said first portion and said second portion.

4. In tongs according to claim 1, wherein the improvement further comprises at least one regulatable abutment (28) mounted between the two handles for further ensuring control of force applied to said electrical cables by said tongs.

5. In tongs according to claim 1, wherein the heating elements are electrodes.

* * * * *